United States Patent
Haertel et al.

(10) Patent No.: US 7,269,954 B2
(45) Date of Patent: Sep. 18, 2007

(54) METHOD FOR OPERATING A GAS TURBINE INSTALLATION, AND GAS TURBINE INSTALLATION

(75) Inventors: Carlos Jimenez Haertel, Munich (DE); Sasha Savic, Wettingen (CH); Hanspeter Zinn, Ruetihof (CH)

(73) Assignee: ALSTOM Technology Ltd., Baden (CH)

( * ) Notice: Subject to any disclaimer, the term of this patent is extended or adjusted under 35 U.S.C. 154(b) by 424 days.

(21) Appl. No.: 11/009,131

(22) Filed: Dec. 13, 2004

(65) Prior Publication Data

US 2006/0075755 A1    Apr. 13, 2006

Related U.S. Application Data

(63) Continuation of application No. PCT/CH02/00651, filed on Dec. 2, 2002.

(30) Foreign Application Priority Data

Jun. 13, 2002  (CH) .................... 2002 1010/02

(51) Int. Cl.
*F02C 7/00* (2006.01)
*F02C 7/143* (2006.01)

(52) U.S. Cl. .................. 60/775; 60/39.53; 60/728; 60/39.3

(58) Field of Classification Search .................. 60/775, 60/39.53, 728, 806, 39.3
See application file for complete search history.

(56) References Cited

U.S. PATENT DOCUMENTS 5,038,304 A * 8/1991 Bonne ................... 702/99
5,348,394 A * 9/1994 Hori et al. ................ 374/44
5,867,977 A * 2/1999 Zachary et al. ........... 60/39.53
6,250,064 B1   6/2001 James et al.
6,609,412 B2 * 8/2003 Dimarzo et al. ........... 73/25.01
6,879,708 B2 * 4/2005 Wernet et al. ............. 382/107

FOREIGN PATENT DOCUMENTS

DE         42 37 665        5/1994

(Continued)

OTHER PUBLICATIONS

Copy of Search Report for Swiss Appl. No. CH 10102002 (Sep. 26, 2002).
Copy of International Search Report for PCT Appl. No. PCT/CH02/00651 (Mar. 27, 2003).
Copy of International Preliminary Examination Report for PCT Appl. No. PCT/CH02/00651 (May 28, 2003).

*Primary Examiner*—Ted Kim
(74) *Attorney, Agent, or Firm*—Adam J. Cermak; Cermak Kenealy & Vaidya LLP

(57) ABSTRACT

A method for operating a gas turbine installation (1) includes sucking in a gaseous medium (2) by the compressor (3) and compressed in the compressor space, a liquid medium (10) being injected into the gaseous medium (2), so that a two-phase flow comprising a gaseous phase and a liquid phase is formed at least in a subregion of the compressor (3). The gaseous medium (2) is then burnt with fuel (5) in a combustion chamber (6) to form hot gases (7), and the hot gases (7) are expanded in a turbine (8), the hot components of the gas turbine installation (1) being cooled by cooling air (14) of a cooling air system. A measurement is carried out to determine whether a liquid phase is present in a region of the compressor (3) and/or of the cooling air system.

11 Claims, 1 Drawing Sheet

FOREIGN PATENT DOCUMENTS

| | | |
|---|---|---|
| DE | 199 00 026 | 7/2000 |
| EP | 0 770 771 | 5/1997 |
| EP | 0 781 909 | 7/1997 |
| WO | 97/43530 | 11/1997 |

\* cited by examiner

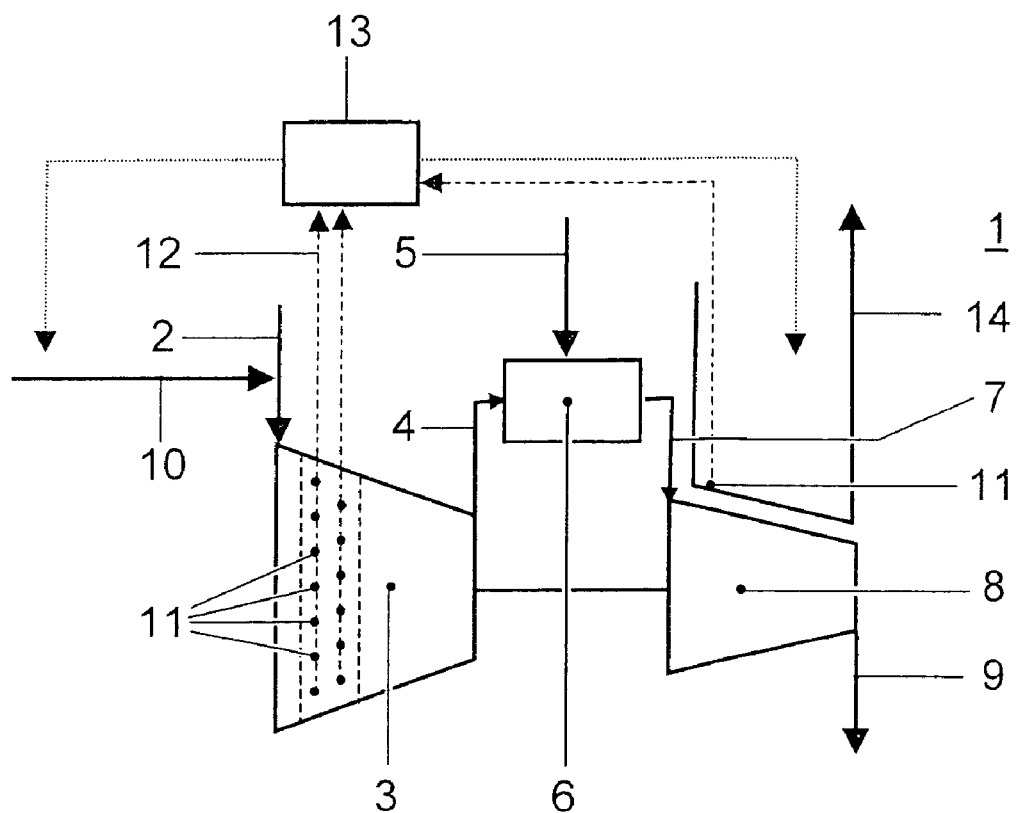

METHOD FOR OPERATING A GAS TURBINE INSTALLATION, AND GAS TURBINE INSTALLATION

This application is a Continuation of, and claims priority under 35 U.S.C. § 120 to, International application no. PCT/CH02/00651, filed 2 Dec. 2002, and claims priority to Swiss application no. 2002 1010/02, filed 13 Jun. 2002, the entireties of both of which are incorporated by reference herein.

BACKGROUND OF THE INVENTION

1. Field of the Invention

The present invention relates to a method for operating a gas turbine installation, and to a gas turbine installation.

2. Brief Description of the Related Art

It is known from the prior art that the mass flow of the compressor can be cooled to increase the power of gas turbines. Cooling of the mass flow of air which is taken up by the gas turbine leads to an increased power output from the turbomachine. The reasons for this are firstly the increased mass flow of air resulting from the cooling and also the reduction in the power consumption of a compressor device at lower inlet temperatures. In principle, two types of cooling are known, cooling of the inlet air which flows into the compressor, and intercooling between two separate compressor stages.

Intercooling of the air during compression, as is known from DE A1 42 37 665, reduces the power consumption of a turbo-compressor as a result of a reduction in the compression work. In this case, however, unlike with inlet cooling, there is no increase in the mass flow of air. In most cases, conventional heat exchangers are used for the intercooling.

In recent times, there have been increased efforts to achieve the desired cooling both in the case of inlet cooling and in the case of intercooling, by the injection of water. For intercooling, this is known, for example, from EP-A1 0 770 771. This, however, uses exclusively the concept of cooling by evaporation, in which finely atomized, demineralized water is added to the air flow. In the case of intercooling, this takes place in the interior of the compressor means between individual compressor stages (known as "spray intercooling"), whereas in the case of inlet cooling this takes place as early as upstream of the compressor means, in the air inlet. The addition of drops of water means that the compressor is partially operated "wet", i.e. with a 2-phase medium, downstream of the location where the drops are added. Even for relatively small quantities of injected water of only 1-1.5% (based on the intake mass flow of air), the wet region of the compressor may extend over 5-8 stages. The length of the wet compressor part is not only a function of the quantity of water added but also is dependent on the drop size spectrum and on the air inlet temperature. Only after complete evaporation of the water does the compressor return to operation with dry gas. In previous "wet" operation of the compressor, no special precautions are taken making it possible to determine which drop size spectrum is present in the air sucked in by the compressor and which drop size spectrum is established within the compressor. Whereas the drop size spectrum in the intake air stream is dependent on the spray technique used, the velocity distribution in the air inlet and the positioning of the spray device, the drop size spectrum (which constantly changes in the downstream direction) in the compressor is influenced by the pressure change in the compressor means, the increase in temperature and, in very general terms, by the aerodynamic properties of the flow in the compressor means.

Particular difficulties arise when using the "wet" operation of a compressor from the fact that the drops in the compressor on the one hand may strike blades and vanes and other surfaces at a high velocity and on the other hand lead to the formation of films of water on the blades and vanes and on the casing. This entails a range of problems, of which just four are to be mentioned here by way of example:

(I) the aerodynamic properties of the blades and vanes change, (II) water can penetrate into cooling air lines and other components of the cooling air system and have an adverse effect on the turbine cooling, (III) existing pressure and temperature sensors give different measurement results depending on whether they are dry or wet, (IV) the impinging water drops may erode the blades and vanes and other structure parts and lead to increased corrosion through film formation. In this context, the type and extent of the film formation and also the strength of the drop impingement are highly dependent on the drop size spectrum in the two-phase flow.

These examples demonstrate that it is of great interest for monitoring of the gas turbine and of the "wet" operation of the compressor—and therefore with a view to ensuring reliable operation—to detect liquid water which is present in the compressor and in the secondary air system and/or to enable the drop size spectrum in the flow passage of the compressor to be determined. However, the measurement devices which have hitherto been installed in commercially available gas turbine installations are unsuitable for this purpose. Reliable determination of the presence of water in the compressor, the determination of the extent of the wet region and/or the drop size spectrum in the compressor is not therefore currently possible in installations of this type.

SUMMARY OF THE INVENTION

Accordingly, one aspect of the present invention includes a method for operating a gas turbine installation which allows wet and dry compressor stages, the drop size spectrum in the compressor and the possible presence of water in the cooling air systems to be determined.

According to some of numerous principles of the present invention, an exemplary method includes using liquid sensors to measure at which location or in which region a liquid phase is present inside the compressor and/or the cooling air system. By way of example, it is possible to determine the subregion of the compressor in which a two-phase flow is present.

In this context, the term "liquid phase" is to be understood as encompassing both possible films of liquid on the surfaces and the drops which are present in the air stream. The following statements apply with regard to the measurement of the liquid phase by the abovementioned sensors:

1. To detect films of liquid, it is advantageously possible to use water detectors which operate on the basis of the conductivity principle as liquid sensors. Other suitable measurement techniques include laser-optical methods which operate on the basis of the backscatter principle and therefore if appropriate also allow the thickness of a film of liquid to be measured.

2. For the measurement of droplets in the gas phase, it is possible for what are known as laser-optical droplet sizers to be suitably used as liquid sensors. Such devices may, for example, operate on the basis of a diffraction method or on the basis of the principle of phase-Doppler anemometry. In this context, it is also particularly advantageous to use a measurement method which is based on the principle of the backscattering of laser light (e.g. a laser-speckle method), since in this case only a single optical access is required, i.e. the transmission and reception unit can be integrated in one sensor head.

Exemplary methods according to the invention allow the wet and dry regions within the compressor and the cooling air system to be identified. If a plurality of sensors are used over a plurality of compressor stages and relatively large parts of the cooling air system, it is possible to observe the current operating state of the compressor and the cooling air system in order to identify the wet and dry regions. The quantity of liquid medium injected into the compressor can then be regulated as a function of the identified region and/or of the identified drop size spectrum. The gas turbine can also be regulated as a function of the identified region and/or the determined drop size spectrum.

If a multiplicity of liquid sensors are present over the circumference of the compressor space, it is possible to identify the circumferential distribution of the liquid phase. Depending on the liquid sensor used, it is also possible to monitor the quality, i.e. the chemical composition, of the liquid medium.

In one advantageous exemplary embodiment, the gaseous medium in the compressor is air and the liquid medium in the compressor is water which is injected into the air.

According to another aspect of the present invention, in an exemplary compressor liquid sensors are provided along the inner wall of the compressor, the surface of the shaft of the compressor, the surface of the blading of the compressor, and/or on a wall of the cooling air system.

The liquid sensors may therefore advantageously be present on the inner wall of the compressor, the surface of the shaft of the compressor, the surface of the blading of the compressor and/or on a wall of the cooling air system.

The liquid sensors on the compressor wall and/or the wall of the cooling air system may be positioned flush with the wall surface. They are secured either permanently or releasably by screw connection or flange connection, which allows the liquid sensor to be removed and replaced. Arranging a plurality of liquid sensors over the circumference of the compressor allows on-line analysis of the circumferential distribution of the injected quantity of water. The liquid sensors may be connected to a system monitoring unit.

BRIEF DESCRIPTION OF THE DRAWINGS

The single drawing FIGURE schematically illustrates method and apparatus embodiments exemplifying principles of the present invention.

DETAILED DESCRIPTION OF EXEMPLARY EMBODIMENTS

The only FIGURE illustrates a gas turbine installation 1. Air 2 is sucked in by a compressor 3. The compressed air 4 is burnt together with fuel 5 in a combustion chamber 6 to generate hot gases 7. Then, the hot gases 7 are passed into a turbine 8 which drives a generator (not shown) for generating electrical energy. The exhaust gases 9 which are formed can be used in a heat recovery scheme generator or in some other way. To increase the power, water 10 is injected into the compressor 3. As illustrated in the only FIGURE, it may be injected into the intake air 2 or also into certain stages of the compressor 3. In this way, a two-phase flow comprising a gaseous phase and a liquid phase is formed in a defined region of the compressor 3. As soon as the injected water 10 has evaporated, the two-phase flow is converted back into a single-phase flow comprising only a gas phase. Furthermore, the hot components of the gas turbine installation 1 are cooled by cooling air 14 which flows through a cooling air system, indicated diagrammatically, while the installation is operated.

According to the invention, liquid sensors 11 are arranged in the compressor space of the compressor 3 for identifying drops in the gas phase and/or for identifying films of liquid on the flushed surfaces of the blade passage of the compressor 3 and/or in the cooling air system. For this purpose, liquid sensors 11 are fitted, the measurement element of which extends into the compressor space or into the cooling system and may be positioned flush with the wall surface. Securing is either permanent or by means of a releasable screw or flange connection, allowing the liquid sensor 11 to be removed and replaced. The invention encompasses liquid sensors 11 of any measurement principle which permits reliable use under the typical operating conditions of a gas turbine installation 1.

In the present application, it is possible in particular to use water detectors which operate on the basis of a conductivity measurement method to measure the films of liquid. In this case, the electrical resistance of the surrounding medium is measured at the free end of a probe head. The differences in the electrical resistance of air and water make it possible to detect the presence of liquid. The feed voltage used for water detectors operating on the basis of a measurement principle of this type may advantageously be AC voltage in order to prevent saturation effects through electrolysis at the film of water. Alternatively, it is also possible to use laser-optical methods working on the back-scattering principle which, moreover, allow the thickness of the film of liquid to be measured.

The invention also relates to determination of the drop size spectrum at suitable positions in the flow passage of the compressor in order to monitor the "wet" operation of the compressor. This monitoring may apply both to the mass flow (which can be determined for example by means of the measured density of the spray) and to the quality of atomization by the spray system. Monitoring of this type allows quality defects and malfunctioning of the system to be detected in good time or alternatively also allows any age-induced or wear-induced deterioration of the system performance to be detected in good time. This deterioration may be caused, for example, by partial or complete blockage of nozzles or erosion of the latter. The present invention for determining the drop size spectrum encompasses measurement arrangements of any measurement principle which allows reliable use under the typical operating conditions of a gas turbine. In particular, it is possible to use measurement arrangements which operate on the basis of a laser-optical diffraction measurement method. Other suitable measurement methods include phase-Doppler anemometry, shadowgraphy techniques and methods based on the principle of analyzing back-scattered laser light, such as for example the laser-speckle method. The invention encompasses a sensor which is mounted on the compressor and which (depending on the measurement principle) measures the drop size spectrum in a (partial) volume, along a jet or in a measurement plane within the flow passage. Moreover, any transmission and reception units are fitted in such a way that vibrations of the compressor in operation are not directly transmitted to the measurement device. This form of mounting is particularly advantageous in the case of optical measurement methods, since with these methods it is necessary to satisfy high demands with regard to lack of vibrations.

Connections 12 for signal transmission connect the liquid sensors 11 to an evaluation unit or system monitoring unit 13, which measures the signals and converts them into suitable output signals. The connections 12 are shielded from interference in accordance with the signal requirements. Further evaluations (e.g. storage of the data for trend analysis) and/or system monitoring functions may likewise be integrated in the evaluation unit 13. The signal transmission to the evaluation unit 13 is effected in the usual way, i.e. by for example 4-20 mA, binary volt signals or digital signals.

The method according to the invention allows the wet and dry regions within the compressor 3 to be identified and the possible penetration of water into the cooling air system of the gas turbine installation 1 to be detected and also allows determination of the drop size spectrum in the compressor. If a plurality of liquid sensors 11 are used to determine the drop size spectrum over a plurality of compressor stages and over relatively large parts of the cooling air system, comprehensive observation of the current operating state of the compressor and the cooling air system with regard to the presence of films of liquid on the surfaces in question and/or with regard to the presence of drops in the gas phase is possible. Moreover, arranging a plurality of liquid sensors 11 over the circumference of the compressor 3 allows on-line analysis of the circumferential distribution (uniformity) of the quantity of water injected.

As is indicated by the dotted lines in the only FIGURE, the additional measurement signals can in principle be used for the protection and running concept of the gas turbine installation 1 with water injection, for example for trip signals, as signals for regulating the gas turbine installation 1, as signals for regulating the injected quantity of water 10 to trigger protection operations (e.g. reduction of the injected quantity of water or other changes in settable machine parameters) in the event of predetermined limits being exceeded or undershot. A correlation between the output signals from the detectors 11 and/or the evaluation unit 13 with other operating characteristic variables, such as temperatures, pressures, emissions or other gas turbine parameters in order to predict the state of the machine with a view to optimizing the operating performance, avoiding critical operating states or other applications, etc., is also conceivable. The information obtained can also be used, for example, to adapt the compressor characteristics in the performance model of the gas turbine installation 1 and to determine the current pumping limit spacing in operation.

LIST OF DESIGNATIONS

1 Gas turbine installation
2 Gaseous medium, air
3 Compressor
4 Compressed air
5 Fuel
6 Combustion chamber
7 Hot gases
8 Turbine
9 Exhaust gases
10 Liquid medium, water
11 Liquid sensor
12 Connection
13 Evaluation unit, system monitoring
14 Cooling air While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A method for operating a gas turbine installation, the method comprising:
   sucking in a gaseous medium by a compressor and compressing the gaseous medium in the compressor;
   injecting a liquid medium into the gaseous medium so that a two-phase flow comprising a gaseous phase and a liquid phase is formed at least in a section of the compressor;
   burning the gaseous medium with fuel in a combustion chamber to form hot gases;
   expanding the hot gases in a turbine;
   cooling hot components of the gas turbine installation by cooling air from a cooling air system;
   measuring at which location or in which region a liquid phase is present inside the compressor, inside the cooling air system, or both, with axially spaced liquid sensors.

2. The method as claimed in claim 1, comprising:
   determining the section of the compressor in which a two-phase flow is present.

3. The method as claimed in claim 1, comprising:
   determining the thickness of a liquid film.

4. The method as claimed in claim 1, comprising:
   determining the droplet size spectrum of the two-phase flow within the compressor at a specific location or in a defined region.

5. The method as claimed in claim 4, comprising:
   regulating the quantity of liquid medium injected into the compressor dependent on the identified region, on the identified drop size spectrum, or both.

6. The method as claimed in claim 4, comprising:
   controlling the turbine dependent on the identified region, on the determined drop size spectrum, or both.

7. The method as claimed in claim 1, comprising:
   determining the circumferential distribution of the liquid phase in the compressor.

8. The method as claimed in claim 1, comprising:
   measuring the chemical composition of the liquid medium.

9. The method as claimed in claim 1, wherein the gaseous medium comprises air, and wherein the liquid medium comprises water.

10. The method as claimed in claim 1, comprising:
    regulating the quantity of liquid medium injected into the compressor dependent on the identified region.

11. The method as claimed in claim 1, comprising:
    controlling the turbine dependent on the identified region.

* * * * *